United States Patent
Arnaud et al.

(10) Patent No.: US 6,418,994 B1
(45) Date of Patent: Jul. 16, 2002

(54) TIRE HAVING A STAINLESS STEEL CARCASS REINFORCEMENT

(75) Inventors: Jean-Claude Arnaud, Durtol; Christian Lamoureux, Cournon; Eric Depraetere, Thuret, all of (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 08/999,742

(22) Filed: Jul. 11, 1997

Related U.S. Application Data

(62) Division of application No. 08/323,211, filed on Oct. 14, 1994, now abandoned.

(30) Foreign Application Priority Data

Oct. 15, 1993 (FR) .............................. 93 12528

(51) Int. Cl.$^7$ .............................. B60L 9/00; B60L 9/02; B60L 9/04; D07B 1/06
(52) U.S. Cl. ........................ 152/556; 148/327; 152/451; 428/606; 428/607; 428/677; 428/679; 428/685
(58) Field of Search ................. 152/451, 556; 428/606, 607, 677, 679, 685; 148/325, 327, 597

(56) References Cited

U.S. PATENT DOCUMENTS

| | | |
|---|---|---|
| 2,143,694 A | 1/1939 | Hauvette |
| 2,293,810 A | 8/1942 | Domm |
| 2,605,201 A | 7/1952 | Howe |
| 2,792,868 A | 5/1957 | Benson |
| RE26,454 E | 9/1968 | Goller |
| 3,749,558 A | 7/1973 | Dillenschneider |
| 3,762,145 A | 10/1973 | Kikuchi et al. |
| 3,871,925 A | 3/1975 | Nunes |
| 3,917,492 A | 11/1975 | Backman et al. |
| RE28,964 E | 9/1976 | Nunes et al. |
| 4,042,423 A | 8/1977 | Van den Sype et al. |
| 4,087,295 A | 5/1978 | Sargent et al. |
| 4,106,957 A | 8/1978 | Tournoy |
| 4,161,415 A | 7/1979 | Van den Sype et al. |
| 4,265,678 A | 5/1981 | Hachisuka et al. |
| 4,268,573 A | 5/1981 | Baillievier |
| 4,295,900 A | 10/1981 | Malmgren et al. |
| 4,330,592 A | 5/1982 | Tsukamoto et al. |
| 4,578,124 A | 3/1986 | Yutori et al. |
| 4,929,512 A | 5/1990 | Nishimura et al. |
| 4,960,473 A | 10/1990 | Kim et al. |
| 5,000,912 A | 3/1991 | Bendel et al. |
| 5,137,782 A | 8/1992 | Adriaensen et al. |
| 5,213,632 A | 5/1993 | Peeters et al. |
| 5,248,353 A | 9/1993 | Nishida et al. |
| 5,437,748 A | 8/1995 | Bhagwat et al. |

FOREIGN PATENT DOCUMENTS

| | | |
|---|---|---|
| FR | 2.096.405 | 2/1972 |
| JP | 52-35118 | 3/1977 |
| JP | 3-59183 | 3/1991 |
| JP | 3-240920 | 10/1991 |
| JP | 5-179360 | 7/1993 |
| JP | 5-179361 | 7/1993 |
| WO | WO 91/14811 | 10/1991 |
| WO | WO 92/14811 | 9/1992 |

OTHER PUBLICATIONS

Republique Francaise Rapport de Recherche Preliminaire, May 4, 1994 (No. d'enregistrement national FA 49197 FR 9312528) (with translation).

Rapport de Recherche Europeenne, Nov. 30, 1994, Application No. EP 94 11 5799 (with translation).

*Primary Examiner*—Adrienne C. Johnstone
(74) *Attorney, Agent, or Firm*—Felipe J. Farley; Martin Farrell; Alan A. Csontos

(57) ABSTRACT

The present invention provides a stainless steel wire for a carcass of a tire and a process for making such a wire. The wire comprises at least 0.02% and at most 0.2% carbon, at least 3% and at most 20% nickel, at least 12% and at most 28% chromium, the sum of the nickel and chromium being at least equal to 20% and at most 35% (% in weight). The structure of the steel comprises at least 20% in volume of martensite and it is devoid of austenite or it comprises less than 80% of it in volume.

21 Claims, 1 Drawing Sheet

TIRE HAVING A STAINLESS STEEL CARCASS REINFORCEMENT

This application is a division of application Ser. No. 08/323,211, filed Oct. 14, 1994 now abandoned.

BACKGROUND OF THE INVENTION

The present invention relates to tires reinforced with metallic wires. The invention concerns in particular tires reinforced with stainless steel wires.

Patent application FR-A-2 096 405 describes a tire which comprises a reinforcement layer placed between the layers of the carcass and the rubber tread member, the radially exterior surface of this layer being reinforced by stainless steel metallic cables. No mention of using stainless steel in the carcass of tires is made in this application whose purpose is to prevent corrosion of the steel cables located in the crown of tires, this corrosion being due to humidity which reaches the cables through cracks and cuts of the rubber caused by aging or crossing over nails.

The applicant has found in an unexpected way that one could observe a decrease in the endurance of the steel cables in the carcass plies of tires, as a result of phenomena of fatigue and wear caused by the presence of water in the areas of the carcass, and this even in the absence of cuts or cracks of the rubber. The water which is responsible for this alteration of the properties of the cables probably penetrates into the areas of the carcass, coming from the outside, by migration through the rubber, for example from the inflation gas, or it was already found initially on the inside of the tire, owing to an important humidity content of the rubbers used or resulting from the curing. Lastly, this water can probably also result from incorporation of ambient air in the rubber, at the time of calendering of the cables.

SUMMARY OF THE INVENTION

The purpose of the invention is to remedy the above-noted disadvantages or to alleviate them to a large extent.

Consequently, the invention concerns a steel wire for the carcass of a tire characterized by the following points:

a) its diameter is at least equal to 0.05 mm and at most equal to 0.5 mm;

b) its tensile strength is at least equal to 2000 MPa;

c) the steel of the wire is stainless and it comprises at least 0.02% and at most 0.2% carbon, at least 3% and at most 20% nickel, at least 12% and at most 28% chromium, the sum of the nickel and chromium being at least equal to 20% and at most equal to 35%, all of these values in percentages being the percentages by weight;

d) the structure of the steel comprises at least 20% in volume of martensite and it is devoid of austenite or it comprises less than 80% of it by volume.

The invention also concerns the assemblies intended to be used in the carcasses of tires, these assemblies including at least one wire consistent with the invention.

The invention also concerns the carcasses of tires which include at least one wire or one assembly consistent with the invention.

The invention also concerns the tires which include at least one carcass consistent with the invention.

The invention also concerns a process for preparing the wire in accordance with the invention, this process being characterized by the following points:

a) one starts with a stainless steel wire whose diameter is at least equal to 0.3 mm and at most equal to 3 mm; the steel of the wire comprises at least 0.02% and at most 0.2% carbon, at least 3% and at most 20% nickel, at least 12% and at most 28% chromium, the sum of the nickel and chromium being at least equal to 20% and at most equal to 35%, all of the percentages being by weight; the structure of this steel is entirely austenitic or practically austenitic;

b) at least one work hardening treatment is done, without heat treatment, the total deformation ratio being at least equal to 1.5.

BRIEF DESCRIPTION OF THE DRAWING

The sole diagrammatic FIGURE of the drawing is a radial sectional view of a pneumatic tire having assemblies comprising wire in accordance with the present invention, the radial sectional view being taken perpendicular to the mid-circumferential plane of the tire.

DETAILED DESCRIPTION OF THE PREFERRED EMBODIMENTS

Figure 1:
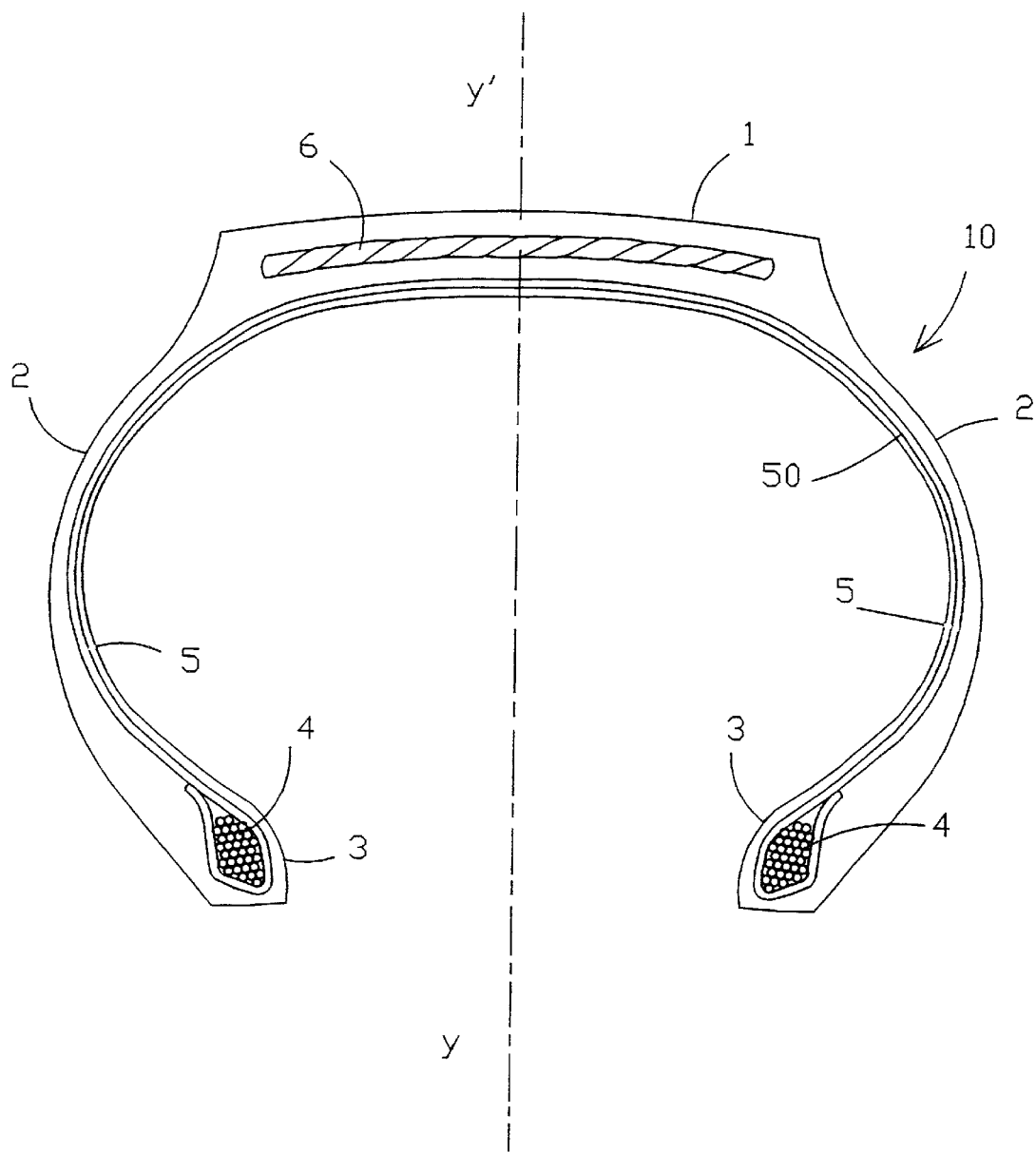

With reference to the sole FIGURE of the drawing, the present invention relating to a wire adapted for use in a carcass of a tire, an assembly comprising such a wire, a tire formed with such an assembly, and a process for making such a wire will now be described.

In the interest of clarity of understanding the following examples which exemplarily describe the invention, the definitional terms and test protocols are to be understood in accordance with the following:

I. Definitions and Tests

1. Dynamometric Measurements

The measurements of tensile strength and plastic elongation are done in traction according to the AFNOR NF A 03-151 method of June 1978.

2. Work Hardening

By definition, the deformation ratio $\epsilon$ of work hardening is given by the formula:

$$\epsilon = Ln(S_o/S_f)$$

Ln being the Napierian logarithm, $S_o$ being the initial section of the wire before this work hardening and $S_f$ being the section of the wire after this work hardening.

3. Ductility in Torsion

By definition, the ductility in torsion of a wire is the number of turns of twist on itself which the wire can handle. This measurement is taken on a length of wire equal to 500 times the diameter. One end of this wire is held in a stationary jaw, and the other end is held in a rotating jaw which is caused to turn such that the axis of rotation is the same as the axis of the wire, the tension at the time of this torsion being equal to 5% of the breaking load of the wire measured before torsion, and the number of twist turns required to cause the rupture of the wire is counted.

4. Structure of Steel

Identification and quantification of the structure of steel are done in the following manner:

A method by diffraction of X-rays is used. The method used consists of determining the total diffracted intensity for each of the phases of the steel, particularly the $\alpha'$ martensite, the $\epsilon$ martensite and the gamma austenite, by adding the integrated intensity of all the peaks of diffraction of this phase, which permits calculation of the percentages of each of the phases relative to the total of all the phases of the steel. The spectra of diffraction on X-rays are determined on the section of the wire to be studied with a goniometer, with the help of an anticathode of chromium.

Scanning allows for the characteristic lines of each of the phases which are present. In the case of the three aforementioned phases (the two martensites and the austenite), the scanning is from 50 degrees to 160 degrees.

To determine the integrated intensities of the peaks, it is necessary to separate the lines which interfere. There is the following relationship for each peak of a given phase:

$$I_{int}=(L_{mh} \times I_{max})/P$$

with:

$I_{int}$=integrated intensity of the peak
$L_{mh}$=width at mid-height of the peak (in degrees)
$I_{max}$=intensity of the peak (in counts per second)
P=the pitch of measurement of the peak (0.05 degree)
There are for example the following characteristic lines:

| | | |
|---|---|---|
| gamma austenite | line (111) | $2\tilde{O}$ = 66.8 |
| | line (200) | $2\tilde{O}$ = 79.0 |
| | line (220) | $2\tilde{O}$ = 128.7 |
| α' martensite | line (110) | $2\tilde{O}$ = 68.8 |
| | line (200) | $2\tilde{O}$ = 106 |
| | line (211) | $2\tilde{O}$ = 156.1 |
| ε martensite | line (100) | $2\tilde{O}$ = 65.4 |
| | line (002) | $2\tilde{O}$ = 71.1 |
| | line (101) | $2\tilde{O}$ = 76.9 |
| | line (102) | $2\tilde{O}$ = 105.3 |
| | line (110) | $2\tilde{O}$ = 136.2 |

The crystallographic structures of the preceding phases are the following:

gamma austenite: face centered cubic
α' martensite: body centered cubic or body centered tetragonal
ε martensite: hexagonal.

The percentage in volume of a given phase "i" can then be calculated, through the following relationship:

percentage of phase "i"=$I_i/I_t$
with:
$I_i$=sum of the integrated intensities of all the peaks of this phase "i"
$I_t$=sum of the integrated intensities of all the peaks of all the phases of diffraction of the steel
Therefore in particular we have:
percentage of α' martensite=$I_{α'}/I_t$
percentage of ε martensite=$I_ε/I_t$
total percentage of martensite=$(I_{α'}+I_ε)/I_t$
percentage of gamma austenite=$I_{gamma}/I_t$
with:
$I_{α'}$=integrated intensity of all peaks of the α' martensite
$I_ε$=integrated intensity of all peaks of the ε martensite
$I_{gamma}$=integrated intensity of all peaks of the gamma austenite In the following disclosure, the various percentages concerning the phases of the structure of the steel are expressed by volume and the terms "martensite" or "martensite phase" cover all of the α' martensite and ε martensite phases, the term percentage in martensite therefore represents the percentage by volume of the total of these two martensitic phases and the term "austenite" represents the gamma austenite.

The percentages by volume of the various phases determined by the preceding method are obtained with a precision of about 5%.

Generally one has the following relationship:

$$f_i^m = \frac{d_i \times f_i^v}{\sum_{j=1}^{j=n} d_j \times f_j^v}$$

with the following meanings:
index "i" corresponds to phase "i"
index "j" corresponds to phase "j"
$f_i^m$ is the massic fraction of phase "i"
$f_i^v$ is the voluminal fraction of phase "i"
$f_j^v$ is the voluminal fraction of phase "J"
$d_i$ is the density of phase "i" calculated from its crystallographic structure
$d_j$ is the density of phase "j" calculated from its crystallographic structure
n is the total number of phases.
Therefore we have:
$100 \times f_i^v$=percentage by volume of phase "i"
$100 \times f_i^m$=percentage by weight of phase "i".

In the case of stainless steels consistent with the invention, the densities of the principal phases (martensite and austenite) have very close values (maximum difference of about 3%) such that the percentages by weight are very close to the percentages by volume.

II. EXAMPLES

The invention will be easily understood using the non-restrictive examples which follow by making reference if necessary to the sole diagrammatic FIGURE of the drawing which represents schematically a tire consistent with the invention.

In these examples one uses wires consistent with the invention called "wire 1" and "wire 2".

In these examples, all percentages indicated are by weight, unless indicated otherwise.

Wire 1

To prepare this wire 1, one uses a stainless steel wire whose characteristics are the following:

structure practically entirely austenitic, meaning that the percentage of martensite is practically nil, meaning less than 5% by volume;
diameter: 0.5 mm;
composition (percentages by weight): C=0.096; Cr=17.6; Ni=7.7; Mo=0.7; Mn=1.3; Si=2.0; Cu=0.2; N=0.04; S=0.001; P=0.019; the remainder consisting of iron with the usual unavoidable impurities.

This steel wire is covered with a 1.3 micrometer layer of nickel.

This wire thus covered with nickel has a tensile strength of 900 MPa and a plastic elongation of 60%.

On this wire covered with nickel a layer of copper and then a layer of zinc are laid, by electrolytic means at the ambient temperature and then heated thermically by joule effect to 540° C. to obtain brass through diffusion of copper and zinc, the ponderal ratio (phase α')/(phase α'+phase β) being equal to 0.85, phases α' and β being the phases of the brass.

This wire is then cold-drawn in a humid environment with a grease which is presented in a known manner in the form of an emulsion in water. This cold-drawing is done several times, the total deformation ratio ε obtained by this cold-drawing being 2.04.

No heat treatment is done on this wire after obtaining the brass covering.

The wire obtained has a diameter of 0.18 mm, the covering of nickel and brass which surrounds it has a very small thickness, less than one micrometer, which is negligible relative to the diameter of the steel wire.

The characteristics of the wire obtained are the following: Structure of the steel: martensitic phase practically equal to 57% by volume, this phase being practically only α' martensite, the austenite phase being practically 43% by volume.

Tensile strength: 2500 MPa.

Plastic elongation: 1%.

Ductility in torsion: 70 twist turns.

Of course, the composition of the steel of the wire in its elements (for example carbon, chromium, nickel) is the same as that of the original wire.

During the wire production process, the covering of nickel permits a good bond of the brass covering on the steel, and the covering of brass facilitates the work hardening of the wire, as well as the adhesion of the wire with the rubber at the time of utilization of the wire in rubber.

Wire 2

The same original wire is used, with nickel covering, as for wire 1, with the difference that its diameter is 0.8 mm.

The same operations are done as for wire 1 but in a way that the total deformation ratio $\epsilon$ is practically equal to 3.

The wire obtained has a diameter of 0.18 mm, here again the thickness of the nickel and brass covering having a negligible thickness relative to this diameter.

The wire obtained has the following characteristics:

Structure of the steel: martensitic phase practically equal to 85% by volume, this phase practically entirely consisting of α' martensite, the austenite phase being practically 15% by volume; tensile strength: 2865 MPa;

plastic elongation: 1%;

ductility in torsion: 170 twist turns.

Of course, the composition of the steel of the wire in its elements (for example carbon, chromium, nickel) is the same as that of the original wire.

Example 1

The purpose of this example is to evaluate the performances of a wire consistent with the invention through a test on a belt.

Assemblies are made of the formula (1+6+12) each consisting of one core, formed by a single wire, surrounded by a layer of 6 wires, this intermediate layer itself being surrounded by an exterior layer of 12 wires, these assemblies being devoid of wrap. All of the wires of the assemblies are consistent with wire 1 and they are therefore consistent with the invention, same as these assemblies. The core of each assembly is practically devoid of torsion and these two layers which surround it have the same pitch, equal to 10 mm, and the same direction of winding. The breaking load of each assembly is 1150 N.

Known control assemblies are also made each having the same structure (1+6+12) as the assemblies consistent with the invention, but whose wires are known wires of 0.18 mm diameter in non-stainless perlitic work hardened steel, having 0.7% in weight of carbon, these wires each having a tensile strength of 2670 MPa, a plastic elongation of 1% and a ductility in torsion of 200 twist turns, the breaking load of each assembly being 1255 N.

The assemblies consistent with the invention on the one hand and the control assemblies on the other hand are incorporated in endless belts each made with a known rubber-based mix like those which are currently used for carcasses of tires. The axis of each assembly is oriented according to the longitudinal direction of the belt in which it is incorporated. Two identical belts are therefore obtained, with the exception of reinforcement assemblies which are found there, the one being reinforced by the assemblies consistent with the invention and the other being reinforced by the control assemblies.

In each belt, the assemblies are separated from the faces of the belt by a thickness of rubber which is about 1 mm.

These two belts are subjected to the same stresses in the following manner. Each belt is made to turn around two rollers, in such a way that each elementary portion of each assembly is subjected to a tension of 138 N and is subjected to cycles of variation of curvature which make it pass from an infinite radius of curvature to a radius of curvature of 40 mm, and this during $50 \times 10^6$ cycles.

At the time of the test, the temperature and humidity of the air in contact with the belts are the same for these belts and are those of the ambient air, that is to say about 20° C. and about 50% relative humidity. The duration of the stresses on each belt is about 3 weeks.

At the end of these stresses, the assemblies are extracted from the belts in the same manner by decortication, the breaking load of each wire of these assemblies is measured and an average is taken on the one hand for assemblies consistent with the invention and on the other hand for the control assemblies.

Two belts identical to the previous ones are also made, one reinforced with the assemblies of the invention, the other with the control assemblies, and these belts are decorticated in the same manner as before, but this time without first subjecting them to stresses, and the breaking load of each wire of these assemblies is measured by taking averages as before. This average value of breaking load for the wires consistent with the invention and this average value of breaking load for the known wires thereby are used as control values, since the corresponding wires have not been subjected to stresses.

It is found that the reduction of the average of the breaking load of the wires after stresses, relative to the average of the breaking load of the wires not subjected to stresses (control values) is the following:

less than 3% for wires consistent with the invention;

15% for the known work hardened perlitic wires.

It is therefore found that the wires according to the invention permit decreasing very significantly the reduction of the breaking load of the wires.

This reduction of the breaking load is due to the wear of the wires caused by the combined action of the stresses and the water coming from the ambient air, these conditions being comparable to those to which the reinforcement wires are subjected in the carcasses of tires.

Example 2

The purpose of this example is to determine the performances of a wire consistent with the invention when it is used in a tire.

Assemblies consistent with the invention are made of the type (3+9)18, with wires identical to wire 2.

These assemblies are cables with layers each consisting of one core of three wires twisted together with a pitch of about 6.3 mm, surrounded by a layer of 9 coiled wires with a pitch of about 12.6 mm, the direction of winding being the same for the core and for the external layer, this assembly being devoid of wrap.

The breaking load of each of these assemblies is equal to 820 N.

Known assemblies are also made having the same formula as the assemblies consistent with the invention, (3+9) 18, but whose wires are known wires of 0.18 mm diameter in non-stainless work hardened perlitic steel having 0.7% carbon, these wires, which are brassed in the same way as the wires consistent with the invention, each having a tensile strength of 2670 MPa, a plastic elongation of 1% and a ductility in torsion of 200 twist turns.

Each of these known assemblies has a breaking load equal to 770 N.

Two tires are made in the size 215/75 R 17.5, one having a radial carcass made with the assemblies consistent with the invention, the other having a radial carcass made with the known assemblies, these tires only differing in the nature of the assemblies used in the carcasses, the tire whose carcass is made, in a known manner, with the known assemblies serving as the control tire.

The single figure shows schematically the tire consistent with the invention. This tire 10 has a crown 1, two sidewalls 2, two beads 3 each reinforced in a known manner with a bead wire 4. A radial carcass 5 is laid from one bead 3 to the other by wrapping around the bead wires 4. This carcass 5 consists of a single ply formed by the assemblies 50 consistent with the invention. The crown 1 is reinforced in a known manner by a belt 6. The line yy' represents the plane perpendicular to the axis of rotation of the tire and passing through the middle of the crown 1 (equatorial plane). The belt 6 includes, in a known manner, two working plies, one triangulation ply, and, above these plies, one protection ply, all of these plies, which are not shown on the drawing for simplification purposes, being reinforced by known steel assemblies.

In each original ply used to make a carcass, the distance between the axes of two given neighboring assemblies is 1.4 mm, before conformation of the tire.

These tires are mounted on known identical rims (not shown on the FIGURE) and both of them are inflated to a pressure of 10.8 bars, each tire containing 2 liters of water and the atmosphere of these tires containing 29% of oxygen (air enriched with oxygen).

Each of these tires is subjected to a load of 2700 daN and they are made to run at 50 kilometers per hour on a drum having a circumference of 8.5 m.

The control tire shows ruptures of the assemblies of the carcass ply in the bead area resulting from a phenomenon of fretting-fatigue after 105,000 km, the tire thus becoming unusable.

The tire consistent with the invention runs without any damage, and therefore without any rupture of the assemblies of the carcass ply, up to 170,000 km.

The invention therefore allows for more than a 60% increase in kilometers travelled.

It is also found, on tires having undergone this test, that the assemblies consistent with the invention only show a very small amount of wear (about 4% in the bead area and about 6 to 7% in the shoulder area), while the known assemblies. show considerable wear locally, more than 20% in these two areas.

The invention therefore permits a very significant increase in the resistance to fatigue and to wear for the steel wires for carcasses of tires , and therefore the tires consistent with the invention which have these wires are characterized by a significantly extended life expectancy, these tires being in particular tires for trucks.

The special composition and structure of the stainless steel used to make the wire consistent with the invention allow for a fine wire to be obtained by work hardening. At the time of work hardening, the austenite is transformed progressively into martensite which allows for good tensile strength to be obtained for the finished wire consistent with the invention. If the sum of the content of nickel and chromium is greater than the claimed sum, the appearance of the martensite phase at the time of work hardening is delayed or prevented and the mechanical resistance of the completed wire is insufficient. On the contrary, if the sum of the nickel and chromium content is less than the claimed sum, the martensite phase is present before work hardening or it appears too early at the time of work hardening and it is impossible to obtain fine wires. Lastly, the claimed deformation ratio permits good ductility in torsion and therefore guarantees a possible utilization of the wire for making assemblies.

The processes and devices for making these assemblies are known by the man of the art and they are not described here for simplicity of the presentation, these processes and devices being for example based on the principles of cabling or twisting.

In summary, the wire consistent with the invention is characterized by the following points:
- good mechanical properties permitting its utilization in carcasses of tires;
- good ductility permitting its easy transformation to obtain assemblies;
- increase in the life expectancy of tires where it is incorporated as a result of its resistance to the action of water.

In the examples of the process consistent with the invention, the original wire used had a nickel covering and a brassing treatment was done before work hardening, but other methods of operation are possible; for example, by replacing the nickel with another metallic material, particularly copper, or by doing the work hardening on an original wire devoid of metallic covering, the final wire may therefore consist only of stainless steel.

Preferably one has at least one of the following characteristics for the wire consistent with the invention:
- the diameter of the wire is at least equal to 0.12 mm and at most equal to 0.3 mm;
- the tensile strength is at least equal to 2400 MPa;
- the carbon content of the steel is at least equal to 0.05% and at most equal to 0.15% by weight;
- the sum of the nickel and chromium is at least equal to 22% and at most equal to 30% by weight;
- the sulfur content and phosphorus content are each less than 0.05% by weight;
- the ductility in torsion is at least equal to 30 twist turns and more preferentially at least equal to 50 twist turns;
- the structure of the steel includes at least 50% by volume of martensite and it is devoid of austenite or it includes less than 50% of it by volume;
- the structure of the steel consists practically either only of martensite, or only of martensite and austenite.

Preferably in the process consistent with the invention one has at least one of the following characteristics:
- the original wire has a diameter at least equal to 0.4 mm and at most equal to 2 mm;

the carbon content of the steel is at least equal to 0.05% and at most 0.15% by weight;

the sum of the nickel and chromium content is at least equal to 22% and at most equal to 30% by weight;

the sulfur content and the phosphorus content are each less than 0.05% by weight;

the original wire is covered with nickel or copper;

a covering of brass is done before work hardening;

work hardening is performed by wet drawing with a grease in emulsion in water;

the total deformation ratio $\epsilon$ is at least equal to 2.

The assemblies consistent with the invention described in the examples all consisted entirely of stainless steel wires consistent with the invention, but the invention applies to cases where the assemblies consist only in part of wires consistent with the invention. Thus, for example, the assemblies consistent with the invention can be cables with layers of which only one part of the wires are consistent with the invention, in particular when all or part of the wires forming one or several internal layers are consistent with the invention, the external layer consisting of non-stainless wires, notably wires of known work hardened perlitic steels. This embodiment can have the advantage of reducing the costs.

Of course, the invention is not limited to the previously described examples of embodiments, thus for example tires consistent with the invention can each have several carcass plies of which at least one consists at least in part of wires and/or assemblies consistent with the invention.

We claim:

1. A tire having a carcass reinforcement comprising at least a steel wire, wherein said steel wire has a diameter equal to at least 0.05 mm and at most 0.5 mm, and has a tensile strength of at least 2000 MPa;

the wire has a ductility in torsion at least equal to 30 twists;

the steel of the wire is stainless steel comprising by weight at least 0.02% and at most 0.2% carbon, at least 3% and at most 20% nickel, at least 12% and at most 28% chromium, the sum of the nickel and chromium being at least equal to 20% and at most equal to 35%; and the structure of the steel of the wire is at least 20% by volume martensite and less than 80% by volume austenite.

2. A tire according to claim 1, wherein the wire further comprises a layer of nickel or copper and an outer layer of brass.

3. The tire as claimed in claim 1, wherein the wire further comprises a layer of one of nickel and copper.

4. The tire as claimed in claim 1, wherein the wire further comprises an outer layer of brass.

5. The tire as claimed in claim 1, wherein the wire further comprises a layer of one of nickel and copper and an outer layer of brass.

6. The tire as claimed in claim 1, wherein the steel of the wire comprises at least 0.05% and at most 0.15% carbon by weight.

7. The tire as claimed in claim 1, wherein the steel of the wire comprises nickel and chromium in combined content of at least 22% and not more than 30% by weight.

8. The tire as claimed in claim 1, wherein the steel of the wire comprises sulfur and phosphorus in content each of less than 0.05% by weight.

9. The tire as claimed in claim 1, wherein the structure of the steel of the wire is at least 50% martensite by volume and less than 50% austenite by volume.

10. The tire as claimed in claim 1, wherein the structure of the steel of the wire is substantially entirely martensite.

11. The tire as claimed in claim 1, wherein the strength of the steel wire is at least equal to 2400 MPa.

12. The tire as claimed in claim 1, wherein the wire is work hardened by cold-drawing without subsequent heat treatment.

13. The tire as claimed in claim 1, wherein the steel wire is cold worked to a deformation ratio of at least 1.5.

14. The tire according to claim 1, wherein the diameter of the steel wire is at least equal to 0.12 mm and at most equal to 0.3 mm.

15. The tire according to claim 1, wherein the ductility in torsion of the steel wire is at least equal to 50 twist turns.

16. The tire of claim 1, wherein the tire comprises an assembly of steel wires, wherein at least one of the steel wires is said stainless steel.

17. The tire of claim 16, wherein the assembly is a layered cable having 1+6+12 construction.

18. The tire according to claim 1, wherein the carcass reinforcement includes a plurality of said steel wires grouped in an assembly.

19. The tire of claim 18, wherein said assembly is a layered cable.

20. The tire of claim 19, wherein the layered cable has 1+6+12 construction.

21. The tire according to claim 1, wherein the steel of the wire has substantially the following composition: C=0.096; Cr=17.6; Ni=7.7; Mo=0.7; Mn=1.3; Si=2.0; Cu=0.2; N=0.04; S=0.001; P=0.019; wherein the composition is given in percentages by weight and the remainder consisting of iron with the usual unavoidable impurities.

* * * * *